US 9,720,291 B2

(12) United States Patent
Kim et al.

(10) Patent No.: US 9,720,291 B2
(45) Date of Patent: Aug. 1, 2017

(54) LIQUID CRYSTAL DISPLAY

(71) Applicant: Samsung Display Co., Ltd., Yongin-si, Gyeonggi-Do (KR)

(72) Inventors: Hoon Kim, Ansan-si (KR); Ki Chul Shin, Seongnam-si (KR); Dan Bi Yang, Gunpo-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/878,634

(22) Filed: Oct. 8, 2015

(65) Prior Publication Data

US 2016/0154282 A1    Jun. 2, 2016

(30) Foreign Application Priority Data

Nov. 27, 2014  (KR) ........................ 10-2014-0167434

(51) Int. Cl.
G02F 1/1343   (2006.01)
G02F 1/1362   (2006.01)

(52) U.S. Cl.
CPC .... *G02F 1/134309* (2013.01); *G02F 1/13624* (2013.01); *G02F 1/136227* (2013.01); *G02F 2001/134345* (2013.01)

(58) Field of Classification Search
CPC .......................................... G02F 2001/134345
USPC ................................................ 349/139, 144
See application file for complete search history.

(56) References Cited

U.S. PATENT DOCUMENTS

2013/0002625 A1* 1/2013 Liao et al. ........ F20O 1/134345
                                                        349/144
2014/0133073 A1    5/2014 Ahn et al.

FOREIGN PATENT DOCUMENTS

KR    1020110111227 A    10/2011
KR    1020130125638 A    11/2013

* cited by examiner

*Primary Examiner* — Thanh-Nhan P Nguyen
(74) *Attorney, Agent, or Firm* — Innovation Counsel LLP (57) ABSTRACT

A liquid crystal display includes: a first substrate; a gate line disposed on the first substrate; an insulating layer disposed on the gate line; and first and second subpixel electrodes respectively including pixel branch electrodes, wherein the first and second subpixel electrodes respectively comprise first and second regions, the first and second regions of the first subpixel electrode have a polygonal shape where two sides meet in a diagonal line, and one of sides of the polygon, excluding the diagonal line, is perpendicular to the gate line, the first and second regions of the second subpixel electrode have grooves disposed at one of sides thereof corresponding to the shape of the first subpixel electrode, the first and second regions of the first subpixel electrode are connected with each other, and the first and second regions of the second subpixel electrode are connected with each other.

19 Claims, 11 Drawing Sheets

LIQUID CRYSTAL DISPLAY

CROSS-REFERENCE TO RELATED APPLICATION

This application claims priority to and the benefit of Korean Patent Application No. 10-2014-0167434 filed in the Korean Intellectual Property Office on Nov. 27, 2014, the entire contents of which are incorporated herein by reference.

BACKGROUND (a) Field

The present application relates to a liquid crystal display.

(b) Description of the Related Art

A liquid crystal display, which is one of the most common types of flat panel displays currently in use, includes two sheets of display panels with field generating electrodes such as a pixel electrode, a common electrode, and the like, and a liquid crystal layer interposed therebetween. The liquid crystal display generates an electric field in the liquid crystal layer by applying a voltage to the field generating electrodes to determine alignment of liquid crystal molecules of the liquid crystal layer through the generated electric field and control polarization of incident light, thereby displaying images.

Among the liquid crystal displays, a vertically aligned mode liquid crystal display, in which liquid crystal molecules are aligned so that long axes thereof are perpendicular to the upper and lower panels while the electric field is not applied, has been in the limelight because its contrast ratio is high and a wide reference viewing angle is easily implemented.

In such a vertically aligned mode liquid crystal display, in order to implement a wide viewing angle, a plurality of domains having different alignment directions of the liquid crystal molecules may be formed in one pixel.

As such, as a means of forming the plurality of domains, a method of forming cutouts such as minute slits in the field generating electrode or forming protrusions on the field generating electrode is used. According to the method, the plurality of domains may be formed by aligning the liquid crystal molecules in a direction perpendicular to the fringe field by edges of the cutouts or the protrusions and a fringe field formed between the field generating electrodes facing the edges.

The above information disclosed in this Background section is only for enhancement of understanding of the background and therefore it may contain information that does not form the prior art that is already known in this country to a person of ordinary skill in the art.

SUMMARY

Embodiments have been made in an effort to provide a display device of which side visibility is improved and no texture is generated when being bent.

A liquid crystal display according to an exemplary embodiment includes: a first substrate; a gate line disposed on the first substrate; an insulating layer disposed on the gate line; and a first subpixel electrode and a second subpixel electrode including a plurality of pixel branch electrodes, wherein the first subpixel electrode and the second subpixel electrode respectively comprise a first region and a second region, the first region and the second region of the first subpixel electrode have a polygonal shape where two sides meet in a diagonal line, and one of sides of the polygon, excluding the diagonal line, is perpendicular to the gate line, the first region and the second region of the second subpixel electrode have grooves disposed at one of sides thereof corresponding to the shape of the first subpixel electrode, the first region and the second region of the first subpixel electrode are connected with each other, and the first region and the second region of the second subpixel electrode are connected with each other.

The first subpixel electrode may include a vertical stem that is perpendicular to the gate line, a horizontal stem connected with the vertical stem and perpendicular to the vertical stem, and a plurality of minute branches extended in lateral diagonal directions from the horizontal stem.

The length of the minute branches is the longest in a portion close to the vertical stem and may be gradually decreased away from the vertical stem.

The vertical stem of the first region of the first subpixel electrode and the vertical stem of the second region of the first subpixel electrode may be located at opposite sides.

The vertical stem of the first region of the first subpixel electrode and the vertical stem of the second region of the first subpixel electrode may be located at the same side.

An extended line crossing the first region of the second subpixel electrode may be disposed in the first region of the first subpixel electrode, and the extended line may be connected with the second region of the first subpixel electrode.

The liquid crystal display includes: a first drain electrode and a second drain electrode disposed on the insulating layer; and a passivation layer disposed on the first drain electrode and the second drain electrode, wherein a first contact hole extending to the first drain electrode and a second contact hole extending to the second drain electrode are disposed in the passivation layer, and the extended line connecting the first region of the first subpixel electrode and the second region of the first subpixel electrode contacts the first drain electrode through the first contact hole.

The second subpixel electrode may include a vertical stem perpendicular to the gate line, a plurality of horizontal stems connected to the vertical stem and perpendicular to the vertical stem, and a plurality of minute branches extended in lateral diagonal directions from the horizontal stems.

The plurality of horizontal stems may be respectively located in upper, middle, and lower portions of each region of the first region and the second region of the second subpixel electrode, and the horizontal stems in the upper and lower portions may be longer than the horizontal stems in the middle portion.

In the first region or the second region of the second subpixel electrode, the horizontal stem in the middle portion may be removed.

The vertical stem in the first region of the second subpixel electrode and the vertical stem in the second region of the second subpixel electrode may be located at opposite sides.

The vertical stem of the first region of the second subpixel electrode and the vertical stem of the second region of the second subpixel electrode may be located at the same side.

The first region of the second subpixel electrode and the second region of the second subpixel electrode may be connected through an extended line of the second subpixel electrode, and the extended line of the second subpixel electrode may extend to the outside of the first subpixel electrode or extends while crossing an area where the gate line is disposed.

The liquid crystal display may include: a first drain electrode and a second drain electrode disposed on the insulating layer; and a passivation layer disposed on the first drain electrode and the second drain electrode, wherein a first contact hole extending to the first drain electrode and a second contact hole extending to the second drain electrode are disposed in the passivation layer, and an extended line connecting the first region of the second subpixel electrode and the second region of the second subpixel electrode contacts the second drain electrode through the second contact hole.

The liquid crystal display may include: a second substrate corresponding to the first substrate; a common electrode disposed on the second substrate; and a liquid crystal layer provided between the first substrate and the second substrate, wherein a voltage configured to be applied to the first subpixel electrode and a voltage configured to be applied to the second subpixel electrode are different from each other.

Alignment layers may be provided on the first subpixel electrode and the second subpixel electrode, each alignment layer may have a pretilt of a predetermined angle, and a pretilt angle formed in an alignment layer on the first subpixel electrode may be greater than a pretilt angle formed in an alignment layer on the second subpixel electrode.

The first subpixel electrode and the second subpixel electrode may not overlap each other.

The liquid crystal display may be a curved display.

The first region may be provided above the gate line and the second region may be provided below the gate line.

The first region and the second region of the first subpixel electrode may be disposed in the shape of a triangle, and the first region and the second region of the second subpixel electrode may be disposed in the shape of a quadrangle having a triangular-shaped groove disposed in one side thereof corresponding to the first subpixel electrode.

As described, in the display device according to the exemplary embodiment, the first subpixel electrode and the second subpixel electrode are provided in both sides of the gate line so that side visibility can be improved, and a problem of generation of a texture when the display device is bent to implement a curved display can be solved.

DETAILED DESCRIPTION OF THE EMBODIMENTS

The inventive concept will be described more fully hereinafter with reference to the accompanying drawings, in which exemplary embodiments are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 1:
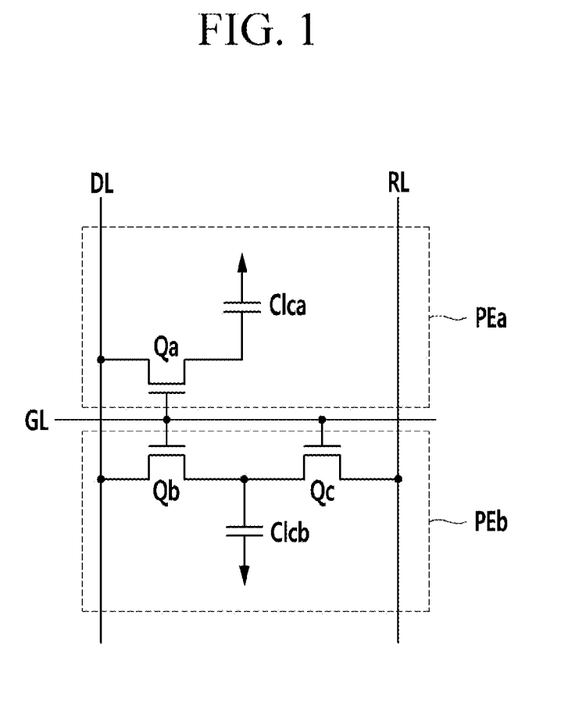
FIG. 1 is an equivalent circuit diagram of a liquid crystal display according to an exemplary embodiment.

First, referring to FIG. 1, a layout of signal lines and pixels of a liquid crystal display according to an exemplary embodiment, and a driving method thereof will be described. FIG. 1 is an equivalent circuit diagram of one pixel of a liquid crystal display according to an exemplary embodiment.

Referring to FIG. 1, a liquid crystal display according to the present exemplary embodiment includes a plurality of signal lines including a gate line GL transmitting a gate signal, a data line DL transmitting a data signal, and a divided reference voltage line RL transmitting a divided reference voltage, first, second, and third switching elements Qa, Qb, and Qc connected to the plurality of signal lines, and first and second capacitors Clca and Clcb, e.g., liquid crystal capacitors.

The first and second switching elements Qa and Qb are respectively connected to the gate line GL and the data line DL, and the third switching element Qc is connected to an output terminal of the second switching element Qb and the divided reference voltage line RL.

The first switching element Qa and the second switching element Qb are three-terminal elements such as thin film transistors, and control terminals thereof are connected to the gate line GL, input terminals thereof are connected to the data line DL, an output terminal of the first switching element Qa is connected to the first liquid crystal capacitor Clca, and an output terminal of the second switching element Qb is connected to the second liquid crystal capacitor Clcb and an input terminal of the third switching element Qc.

The third switching element Qc is also a three-terminal element such as a thin film transistor, and a control terminal thereof is connected to the gate line GL, an input terminal thereof is connected to the second liquid crystal capacitor Clcb, and an output terminal thereof is connected to the divided reference voltage line RL.

When a gate on signal is applied to the gate line GL, the first switching element Qa, the second switching element Qb, and the third switching element Qc connected thereto are turned on. Thus, a data voltage applied to the data line DL is applied to a first subpixel electrode PEa and a second subpixel electrode PEb through the turned-on first and second switching elements Qa and Qb. In this case, the data voltage applied to the first subpixel electrode PEa and the data voltage applied to the second subpixel electrode PEb are equivalent to each other, and the first liquid crystal capacitor Clca and the second liquid crystal capacitor Clcb are equally charged with a difference between a common voltage and the data voltage. Simultaneously, a voltage charged to the second liquid crystal capacitor Clcb is divided through the turned-on third switching element Qc. Thus, a voltage charged to the second liquid crystal capacitor Clcb is decreased by a difference between the common voltage and the divided reference voltage. That is, a voltage charged in the first liquid crystal capacitor Clca becomes higher than the voltage charged to the second liquid crystal capacitor Clcb.

As described, the voltage charged to the first liquid crystal capacitor Clca and the voltage charged to the second liquid crystal capacitor Clcb become different from each other. Since the voltage of the first liquid crystal capacitor Clca and the voltage of the second liquid crystal capacitor Clcb are different from each other, liquid crystal molecules in the first subpixel and the liquid crystal molecules in the second subpixel are tilted with different angles, and accordingly luminances of the two subpixels are different from each other. Accordingly, when the voltage of the first liquid crystal capacitor Clca and the voltage of the second liquid crystal capacitor Clcb are appropriately controlled, an image viewed from the side may be maximally close to an image viewed from the front, thereby improving side visibility.

In the illustrated exemplary embodiment, in order to vary the charged voltage in the first liquid crystal capacitor Clca and the charged voltage in the second liquid crystal capacitor Clcb, the third switching element Qc connected to the second liquid crystal capacitor Clcb and the divided reference voltage line RL is included, but in the case of a liquid crystal display according to another exemplary embodiment, the second liquid crystal capacitor Clcb may be connected to a step-down capacitor. In detail, in another embodiment, the third switching element Qc including a first terminal connected to a step-down gate line, a second terminal connected to the second liquid crystal capacitor Clcb, and a third terminal connected to the step-down capacitor is included, and as a result, some of a charge amount charged in the second liquid crystal capacitor Clcb is charged in the step-down capacitor, thereby differently setting charged voltages between the first liquid crystal capacitor Clca and the second liquid crystal capacitor Clcb. Further, in the case of a liquid crystal display according to another exemplary embodiment, the first liquid crystal capacitor Clca and the second liquid crystal capacitor Clcb are connected to different data lines, respectively, to receive different data voltages, and as a result, the charged voltages between the first liquid crystal capacitor Clca and the second liquid crystal capacitor Clcb may be differently set. In addition, the charged voltages between the first liquid crystal capacitor Clca and the second liquid crystal capacitor Clcb may be differently set by various different methods.

Figure 2:
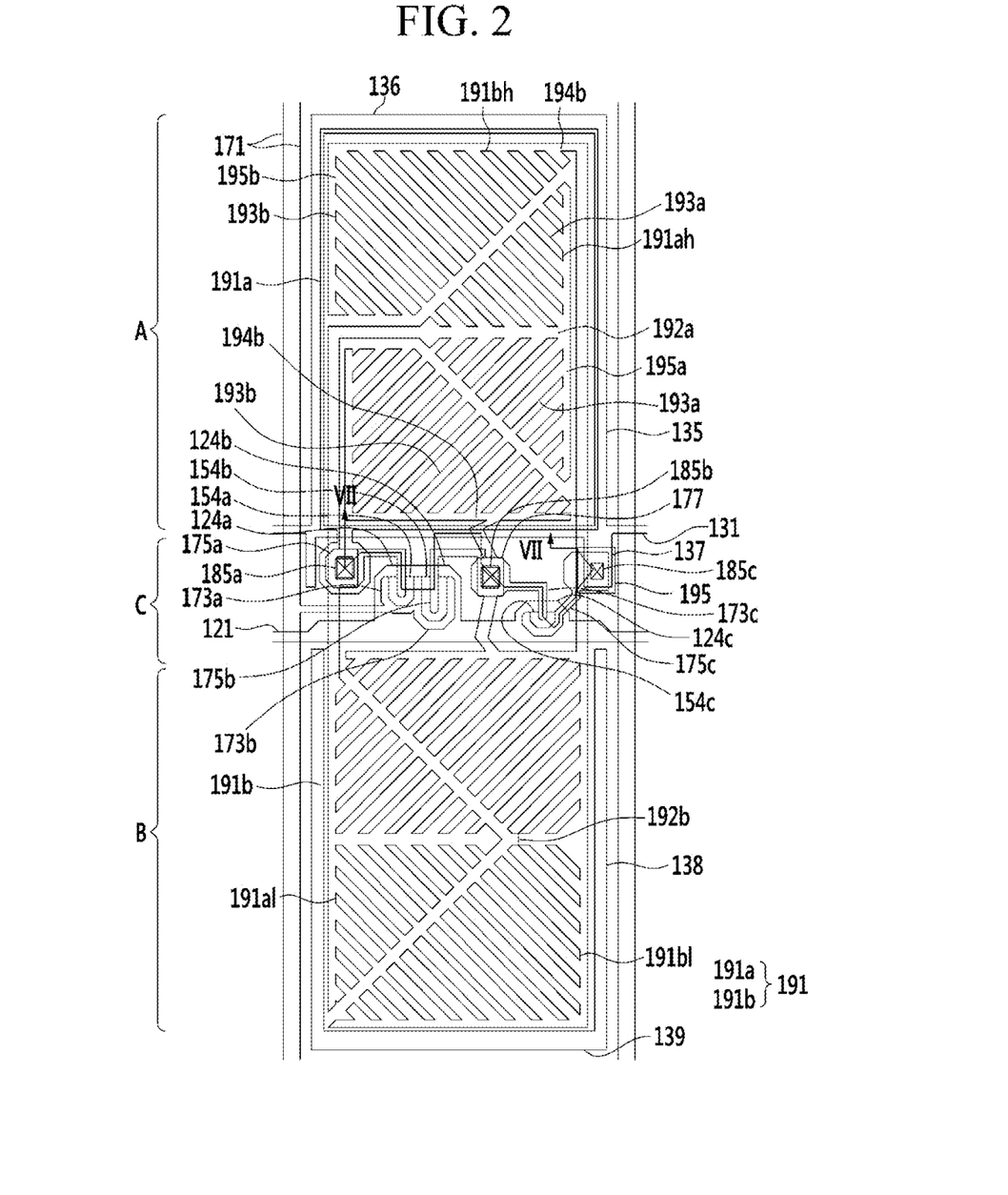
FIG. 2 is a layout view of one pixel of the liquid crystal display according to the exemplary embodiment.
Figure 3:
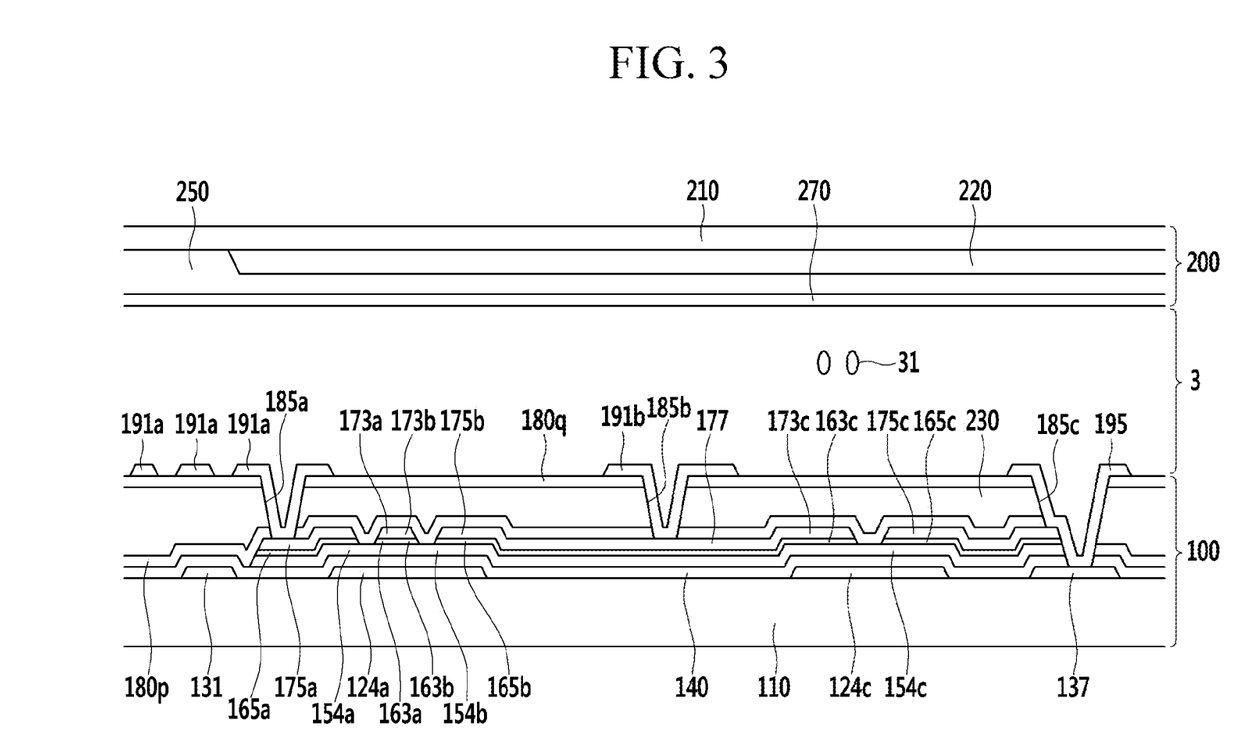
FIG. 3 is a cross-sectional view of the liquid crystal display of FIG. 2, taken along the line VII-VII.
Figure 4:
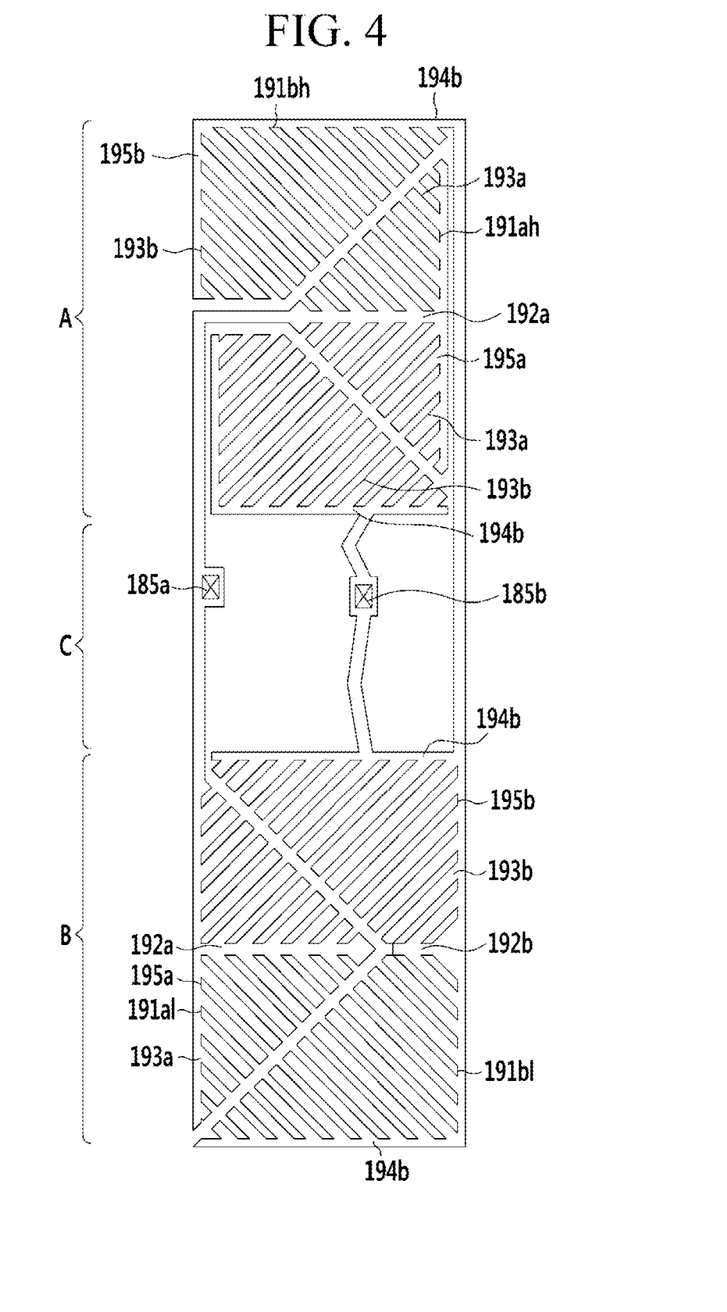
FIG. 4 shows a pixel electrode in the layout view of FIG. 2.
Figure 5A:
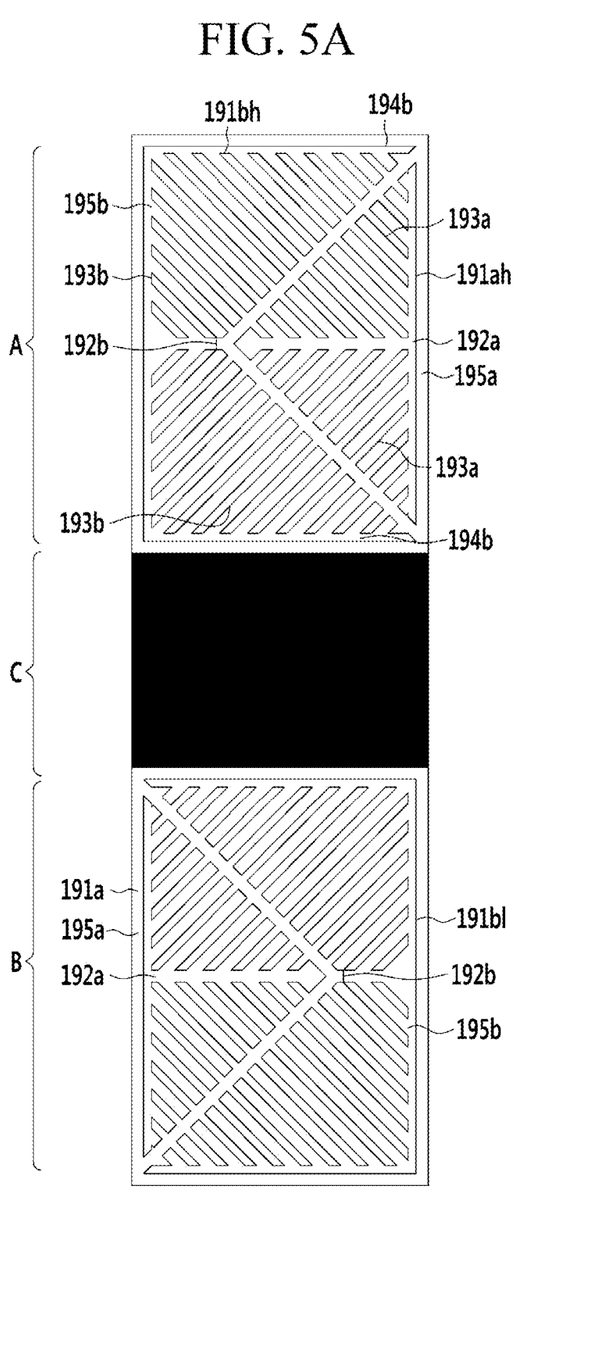
FIG. 5A and FIG. 5B show the shape of a pixel electrode according to the exemplary embodiment.
Figure 5B:
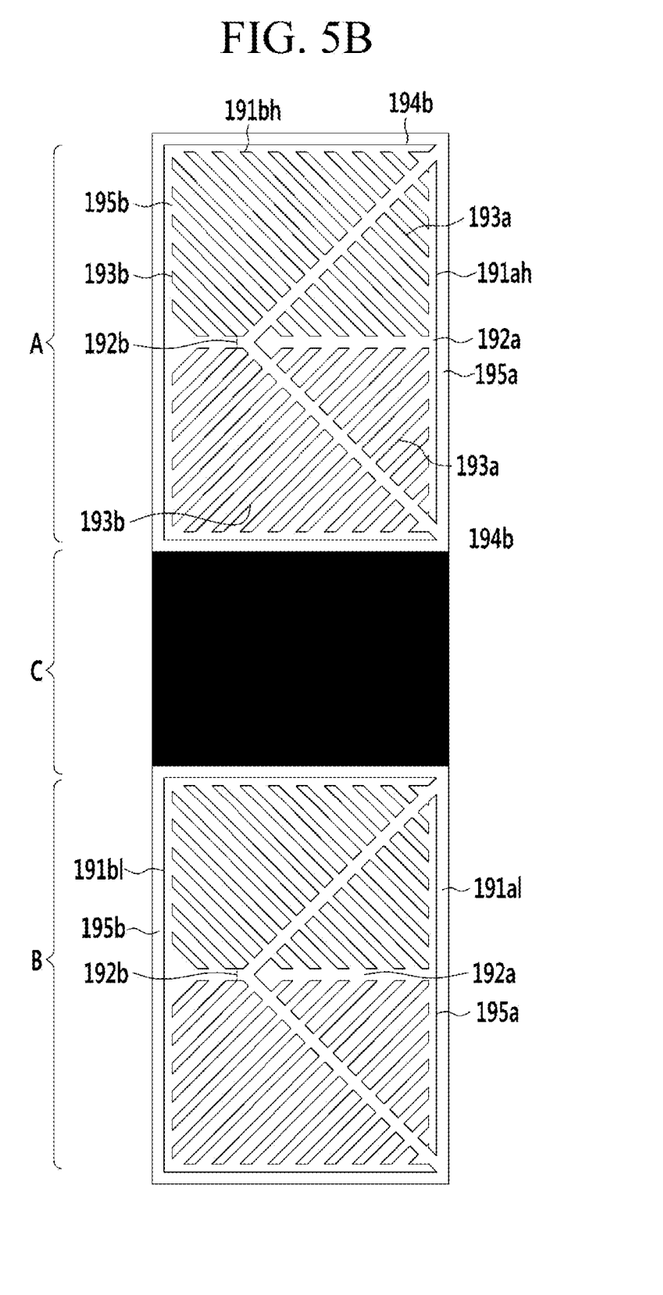

Next, a structure of the liquid crystal display according to the exemplary embodiment of FIG. 1 will be described with reference to FIG. 2 to FIG. 5. FIG. 2 is an exemplary layout view of one pixel of the liquid crystal display according to the exemplary embodiment, and FIG. 3 is a cross-sectional view of the liquid crystal display of FIG. 2, taken along the line VII-VII. FIG. 4 shows a pixel electrode in the layout view of FIG. 2. FIG. 5A and FIG. 5B show the shape of the pixel electrode according to the exemplary embodiment.

First, referring to FIG. 2 and FIG. 3, the liquid crystal display according to the present exemplary embodiment includes lower and upper panels 100 and 200 that face each other, a liquid crystal layer 3 provided between the lower panel 100 and the upper panel 200, and a pair of polarizers (not shown) attached to the outer sides of the panels 100 and 200.

The lower panel 100 will now be described.

A gate conductor including a gate line 121 and a divided reference voltage line 131 is formed on an insulation substrate 110 made of transparent glass or plastic.

The gate line 121 crosses one pixel area, and divides a first area A provided above the gate line 121 and a second area B provided below the gate line 121.

A transistor and the like is formed in the area where the gate line 121 passes and the area is blocked by a black matrix, and the area will be referred to as a thin film transistor C.

The gate line 121 includes a wide end portion (not shown) for contact with a first gate electrode 124a, a second gate electrode 124b, a third gate electrode 124c, and another layer or an external driving circuit.

The divided reference voltage line 131 includes first storage electrodes 135 and 136 and a reference electrode 137. Although not connected to the divided reference voltage line 131, second storage electrodes 138 and 139 are provided in a lower area with reference to the gate line 121.

A gate insulating layer 140 is formed on the gate line 121 and the divided reference voltage line 131.

A first semiconductor 154a, a second semiconductor 154b, and a third semiconductor 154c are formed on the gate insulating layer 140.

A plurality of ohmic contacts 163a, 165a, 163b, 165b, 163c, and 165c are formed on the semiconductors 154a, 154b, and 154c.

A plurality of data lines 171 including a first source electrode 173a and a second source electrode 173h and a data conductor including a first drain electrode 175a, a second drain electrode 175b, a third source electrode 173c, and a third drain electrode 175c are formed on the ohmic contacts 163a, 165a, 163b, 165b, 163c, and 165c and the gate insulating layer 140.

The data conductor, the semiconductor positioned below the data conductor, and the ohmic contact may be simultaneously formed by using one mask.

The data line 171 includes a wide end portion (not shown) for contact with another layer or an external driving circuit.

The first gate electrode 124a, the first source electrode 173a, and the first drain electrode 175a form a first thin film transistor (TFT) Qa together with the first semiconductor 154a, and a channel of the first thin film transistor Qa is formed in the first semiconductor 154a between the first source electrode 173a and the first drain electrode 175a. Similarly, the second gate electrode 124b, the second source electrode 173b, and the second drain electrode 175b form a second thin film transistor Qb together with the second semiconductor 154b, and a channel of the second thin film transistor Qb is formed in the second semiconductor 154h between the second source electrode 173b and the second drain electrode 175b. The third gate electrode 124c, the third source electrode 173c, and the third drain electrode 175c form a third thin film transistor Qc together with the third semiconductor 154c, and a channel of the third thin film transistor Qc is formed in the third semiconductor 154c between the third source electrode 173c and the third drain electrode 175c.

The second drain electrode 175h is connected with the third source electrode 173c, and includes a widely expanded portion 177.

A first passivation layer 180p is formed on the data conductors 171, 173c, 175a, 175b, and 175c, and the exposed portions of the semiconductors 154*a*, 154*b*, and 154*c*. The first passivation layer 180*p* may include an inorganic insulating layer such as a silicon nitride or a silicon oxide. The first passivation layer 180*p* may prevent a pigment of a color filter 230 from flowing into exposed portions of the semiconductors 154*a*, 154*b*, and 154*c*.

The color filter 230 is formed on the first passivation layer 180*p*. The color filter 230 extends in a vertical direction along two adjacent data lines 171. However, the color filter 230 may be provided in the upper panel 200 according to another exemplary embodiment.

A second passivation layer 180*q* is formed on the color filter 230.

The second passivation layer 180*q* may include an inorganic insulating layer such as a silicon nitride or a silicon oxide. The second passivation layer 180*q* may prevent the color filter 230 from being lifted and suppress the contamination of the liquid crystal layer 3 due to an organic material such as a solvent flowing in from the color filter 230, thereby preventing defects such as an afterimage which may be caused when a screen is driven.

A first contact hole 185*a* and a second contact hole 185*b* that respectively extend to and expose the first drain electrode 175*a* and the second drain electrode 175 are formed in the first passivation layer 180*p* and the second passivation layer 180*q*.

A third contact hole 185*c* that exposes a part of the reference electrode 137 and a part of the third drain electrode 175*c* is formed in the first passivation layer 180*p*, the second passivation layer 180*q*, and the gate insulating layer 140, and a connection member 195, sometimes called a connecting member 195, covers the third contact hole 185*c*. The connecting member 195 electrically connects the reference electrode 137 and the third drain electrode 175*c* that are exposed through the third contact hole 185*c*.

A plurality of pixel electrodes 191 are formed on the second passivation layer 180*q*.

Each pixel electrode 191 is divided into a region A and a region B, and is also divided in each of the regions A and B.

Referring to FIG. 2 and FIG. 4, the pixel electrode 191 is divided into a first subpixel electrode 191*a* and a second subpixel electrode 191*b*.

In addition, the first subpixel electrode 191*a* is divided into the region A and the region B, and a first subpixel electrode 191*ah* in the region A and a first subpixel electrode 191*al* in the region B are connected with each other in the thin film transistor region C.

Similarly, the second subpixel electrode 191*b* is divided into the region A and the region B, and a second subpixel electrode 191*bh* in the region A and a second subpixel electrode 191*bl* in the region B are connected with each other in the thin film transistor region C.

Next, the shape of the pixel electrode according to the exemplary embodiment will be described in detail with reference to FIG. 5A and FIG. 5B.

First, in the region A, the first subpixel electrode 191*ah* and the second subpixel electrode 191*bh* are separately from each other in a direction that is oblique to the data line 171. That is, the first subpixel electrode 191*ah* is formed in the shape of an isosceles triangle of which the bottom side is parallel with the data line 171. On the other hand, the second subpixel electrode 191*bh* is formed in the shape of a quadrangle having a V-shaped groove that surrounds the triangle-shaped first subpixel electrode 191*ah*.

In this case, the first subpixel electrode 191*ah* includes a horizontal stem 192*a* and minute branches 193*a* extended from the horizontal stem 192*a*. The horizontal stem 192*a* perpendicularly crosses a vertical stem 195*a* formed at one end thereof, and the minute branches 193*a* extended from the horizontal stein 192*a* are extended up and down in an oblique direction from the horizontal stem 192*a*.

Similarly, the first subpixel electrode 191*al* in the region B also includes a horizontal stem 192*a* and minute branches 193*a* extended from the horizontal stem 192*a*. The horizontal stem 192*a* perpendicularly crosses a vertical stem 195*a* formed at one end thereof, and the minute branches 193*a* extended from the horizontal stem 192*a* extend up and down in an oblique direction from the horizontal stem 192*a*.

Referring to FIG. 5A, the vertical stem 195*a* of the first subpixel electrode 191*ah* in the region A and the vertical stem 195*a* of the first subpixel electrode 191*al* in the region B are located at opposite sides in one pixel. However, as shown in FIG. 5B, the vertical stem 195*a* of the first subpixel electrode 191*ah* in the region A and the vertical stem 195*a* of the first subpixel electrode 191*al* in the region B may be located in the same side according to another exemplary embodiment.

The first subpixel electrode 191*ah* in the region A and the first subpixel electrode 191*al* in the region B are connected with each other in the transistor region C. The connection shape may be various, and may be connected as shown in FIG. 4. However, this is not restrictive. The connection shape will be described in detail later.

Referring back to FIG. 5A, the second subpixel electrode 191*bh* in the region A surrounds the first subpixel electrode 191*ah*. That is, the second subpixel electrode 191*bh* has a polygon shape where a triangle-shaped groove that is the same shape of the first subpixel electrode 191*ah* is formed.

The second subpixel electrode 191*bh* in the region A also includes horizontal stems 192*b* and 194*b*, a vertical stein 195*b* perpendicularly crossing the horizontal stems 192*b* and 194*b*, and minute branches 193*b* extended in an oblique direction from the horizontal stems 192*b* and 194*b*.

The second subpixel electrode 191*bh* may include three horizontal stems including the horizontal stem 192*b* in the middle and two horizontal stems 194*b* located at lateral edges thereof.

However, as shown in FIG. 4, a part of the horizontal stem may be eliminated to connect the second subpixel electrode 191*bh* in the region A and the second subpixel electrode 191*bl* in the region B.

The shape of the second subpixel electrode 191*bl* in the region B is the same as the shape of the second subpixel electrode 191*bh* in the region A. The same constituent elements will not be further described.

Referring to FIG. 5A, the vertical stem 195*b* of the second subpixel electrode 191*bh* in the region A and the vertical stem 195*b* of the second subpixel electrode 191*bh* in the region B are located opposite to each other in one pixel. However, as shown in FIG. 5B, the vertical stem 195*b* of the second subpixel electrode 191*bh* in the region A and the vertical stem 195*b* of the second subpixel 191*bl* in the region B may be located in the same side in another exemplary embodiment.

Referring to FIG. 5A and FIG. 5B, the first subpixel electrode 191*a* and the second subpixel electrode 191*b* both include the vertical stems, the horizontal stems that perpendicularly cross the vertical stems, and the minute branches extended from the horizontal stems. In this case, one region (A or B) is obliquely divided by the first subpixel electrode and the second subpixel electrode, and therefore the length of the minute branch of the first subpixel electrode and the length of the minute branch of the second subpixel electrode are not equal to each other.

That is, in the first subpixel electrode 191*ah*, for example, the length of the minute branch 193*a* in a portion that is adjacent to the vertical stem 195*a* is long, but the length of the minute branch 193*a* away from the vertical stem 195*a* is shortened. On the contrary, in the second subpixel electrode 191*bh*, the length of the minute branch 193*b* that is adjacent to the vertical stem 195*b* is the shortest, and the length of the minute branch 193*b* is increased and then shortened again.

That is, the length of the minute branch is not constant in one subpixel electrode. This can solve a problem of generation of a texture in the horizontal stem-type pixel electrode structure, and this will be described later. In a display device having an electrode structure having a vertical stem, a horizontal stem that perpendicular crosses the vertical stem, and minute branches extended from the horizontal stem, liquid crystal molecules are controlled with a different force according to locations, thereby causing generation of a texture.

However, the case of the display device having such an electrode structure, the lengths of the minute branches are different from each other according to locations and a control force in a portion where a force for controlling liquid crystal molecules is weak can be reinforced. Accordingly, generation of such a texture can be prevented.

The pixel electrode 191 may be made of a transparent material such as ITO and IZO. The pixel electrode 191 may be made of a transparent conductive material such as ITO or IZO, or may be made of a reflective metal such as aluminum, silver, chromium, or an alloy thereof.

The first subpixel electrodes 191*ah*, 191*al* and the second subpixel electrodes 191*bh*, 191*bl* are respectively physically and electrically connected with the first drain electrode 175*a* and the second drain electrode 175*b* through the first contact hole 185*a* and the second contact hole 185*b*, and receive data voltages respectively through the first drain electrode 175*a* and the second drain electrode 175*b*. In this case, a part of the data voltage applied to the second drain electrode 175*b* is divided through the third source electrode 173*c*, and thus the voltage applied to the first subpixel electrodes 191*ah*, 191*al* becomes higher than the voltage applied to the second subpixel electrodes 191*bh*, 191*bl*.

Next, a connection structure between the first subpixel electrode and the second subpixel electrode of each region will be described with reference to FIG. 4.

Referring to FIG. 2 and FIG. 4, the second horizontal stem 192*a* of the first subpixel electrode 191*ah* in the region A extends to the transistor region C through the center of the second subpixel electrode 191*bh*. In the transistor region C, an extended portion of the first subpixel electrode 191*ah* contacts the first drain electrode 175*a* through the first contact hole 185*a*. The extended portion of the first subpixel electrode 191*ah* is extended downward again and then connected with the first subpixel electrode 191*al* in the region B. Thus, the voltage applied to the first drain electrode 175*a* is transmitted to the first subpixel electrode 191*ah* in the region A and the first subpixel electrode 191*al* in the region B.

The second subpixel electrode 191*bh* in the region A has a groove formed in a center thereof for connection of the first subpixel electrode 191*ah*. The second subpixel electrodes 191*bh* divided by the groove in the region A are connected with each other through an extended line of the second subpixel electrode 191*bh* extended outside of the first subpixel electrode 191*ah*. In addition, the extended line is extended to the region B and then connected with the second subpixel electrode 191*bl* of the region B. The second subpixel electrode 191*bh* of the region A and the second subpixel electrode 191*bl* of the region B are physically and electrically connected with the second drain electrode 175*b* from the extended lines thereof through the second contact hole 185*b* and receive voltages. In this case, as previously described, a part of the data voltage applied to the second drain electrode 175*b* is divided through the third source electrode 173*c*, and thus the voltage applied to the first subpixel electrodes 191*ah*, 191*al* becomes higher than the voltage applied to the second subpixel electrodes 191*bh*, 191*bl*.

Thus, a tilting degree of the liquid crystal molecules in an area corresponding to the first subpixel electrodes 191*ah*, 191*al* and a tilting degree of the liquid crystal molecules in an area corresponding to the second subpixel electrodes 191*bh*, 191*bl* become different from each other, and accordingly side visibility can be improved.

The first subpixel electrode 191*a* and the second subpixel electrode 191*b* applied with the data voltage generate an electric field together with a common electrode 270 of the upper panel 200 to determine an alignment direction of the liquid crystal molecules of the liquid crystal layer 3 between the two electrodes 191 and 270. According to the determined alignment direction of the liquid crystal molecules, luminance of light passing through the liquid crystal layer 3 is changed.

Next, the upper panel 200 will be described.

A light blocking member 220 is formed on an insulation substrate 210 made of transparent glass or plastic. The light blocking member 220 is also referred to as a black matrix, and prevents light leakage. The light blocking member 220 of the upper panel 200 may be formed in the lower panel 100 in another embodiment.

An overcoat 250 is formed on the light blocking member 220. The overcoat 250 may be made of an (organic) insulation material, and the overcoat 250 may be omitted.

An alignment layer (not shown) may be provided on the overcoat 250.

The liquid crystal layer 3 has negative dielectric anisotropy, and liquid crystal molecules of the liquid crystal layer 3 are aligned so that long axes thereof are perpendicular to the surfaces of the two panels 100 and 200 without applying an electric field.

A method for initially aligning the liquid crystal molecules 31 so as to have pretilts will be described with reference to FIG. 6.

Figure 6:
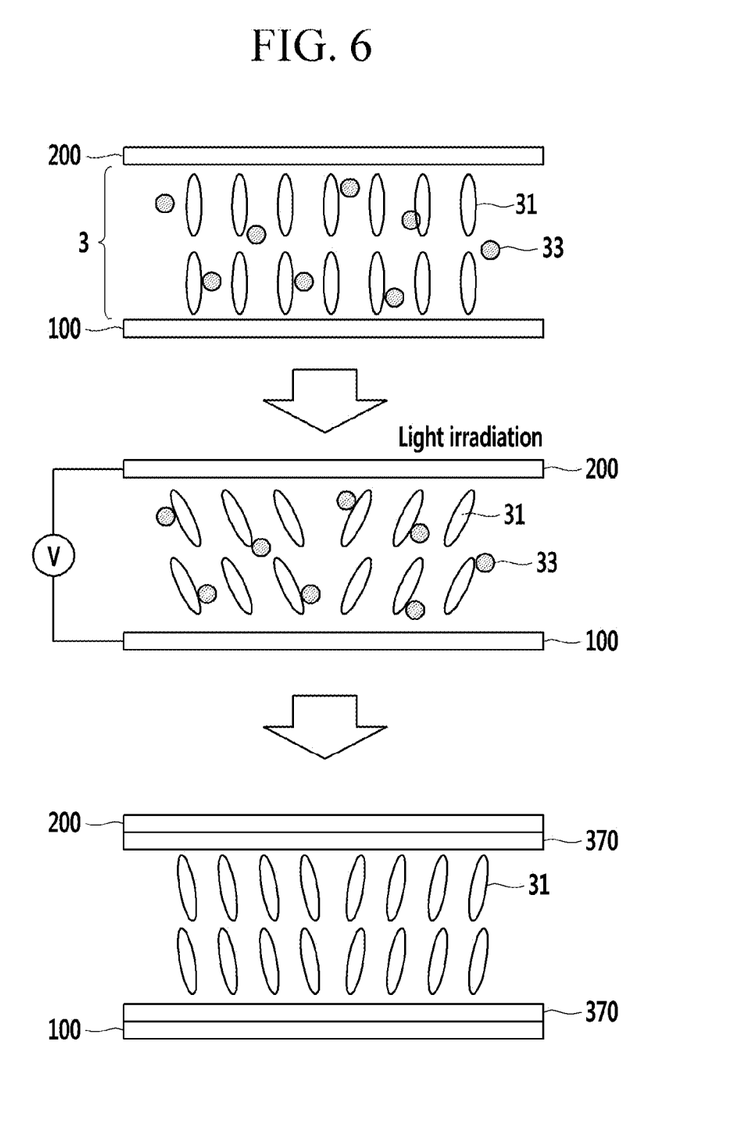
FIG. 6 shows a process through which liquid crystal molecules have pretilts using a prepolymer polymerized by light such as ultraviolet light.

FIG. 6 shows a process through which liquid crystal molecules 31 have pretilts using a prepolymer polymerized by light such as ultraviolet light.

A prepolymer 33 such as a monomer cured by polymerization with light such as ultraviolet rays is injected together with a liquid crystal material between the two panels 100 and 200. The prepolymer 33 may be a reactive mesogen polymerized by the light such as ultraviolet light.

Next, the data voltage is applied to the first subpixel electrode 191*a* and the second subpixel electrode 191*b* and a common voltage is applied to the common electrode 270 to generate an electric field in the liquid crystal layer 3 between the two panels 100 and 200.

In this case, the first subpixel electrodes 191*ah*, 191*al* and the second subpixel electrodes 191*bh*, 191*bl* are respectively supplied with different voltages. The voltage applied to the first subpixel electrodes 191*ah*, 191*al* is higher than the voltage applied to the second subpixel electrodes 191*bh*, 191*bl*, and a tilting degree of liquid crystal molecules 31 corresponding to the first subpixel electrodes 191*ah*, 191*al* and a tilting degree of liquid crystal molecules 31 corresponding to the second subpixel electrodes 191*bh*, 191*bl* become different from each other.

Next, light such as ultraviolet rays is irradiated, the prepolymer 33 is polarized, and thus a polymer 370 shown in FIG. 6 is formed. The polymer 370 is formed while being in contact with the panels 100 and 200. The liquid crystal molecules 31 are pretilted by the polymer 370, and a pretilt angle is proportional to the intensity of the applied electric field. That is, a pretilt of liquid crystal molecules 31 in an area corresponding to the first subpixel electrodes 191*ah*, 191*al* is greater than that of liquid crystal molecules 31 in an area corresponding to the second subpixel electrodes 191*bh*, 191*bl*.

Next, the effect of the display device according to the exemplary embodiment will be described in comparison with a comparative example.

Figure 7:
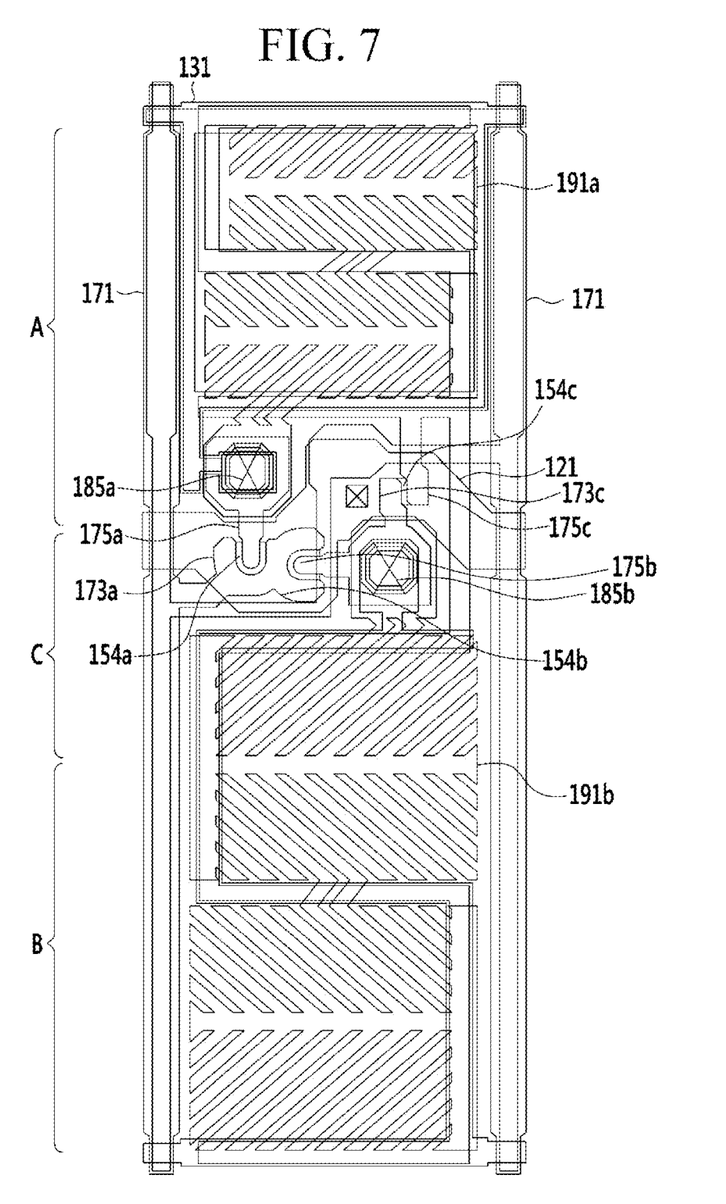
FIG. 7 is a layout view of a display according to a comparative example.

FIG. 7 is a layout view of a display device according to a comparative example in accordance with the inventive concept. Referring to FIG. 7, constituent elements of the display device of FIG. 7 are similar to those of the display device according to the exemplary embodiment, except for the shape of a pixel electrode in FIG. 7. That is, in the display device of FIG. 7, a first subpixel electrode 191*a* is located in a region A and a second subpixel electrode 191*b* is located in a region B.

On the other hand, in the display device according to an exemplary embodiment, e.g., as illustrated in FIG. 4, both of the first subpixel electrode and the second subpixel electrode may be located in the region A, and both of the first subpixel electrode and the second subpixel electrode are may also be located in the region B.

In addition, in the display device of FIG. 7, the pixel electrode includes a horizontal stem, a vertical stem perpendicularly crossing the horizontal stem, and minute branches extended from the horizontal stem, and the length of each minute branch is the same.

In this case, a control force of liquid crystal molecules is weakened in boundaries between minute branches in adjacent regions of the vertical stem, thereby causing generation of a texture.

Figure 8:
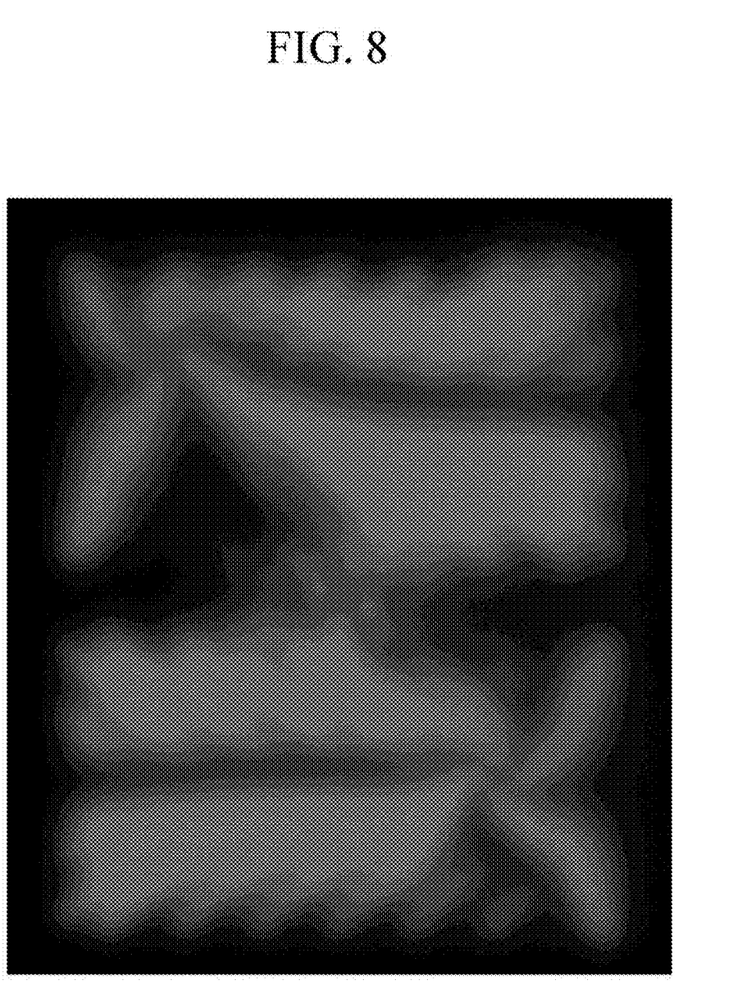
FIG. 8 is an image where a texture is substantially generated in the display device having a pixel structure according to the comparative example.

FIG. 8 is an image where a texture is generated in a display device having the pixel structure according to the comparative example of the inventive concept. As shown in FIG. 8, a texture is generated at a boundary where an alignment direction of the liquid crystal molecules is changed and at the periphery of the vertical stem.

Figure 9:
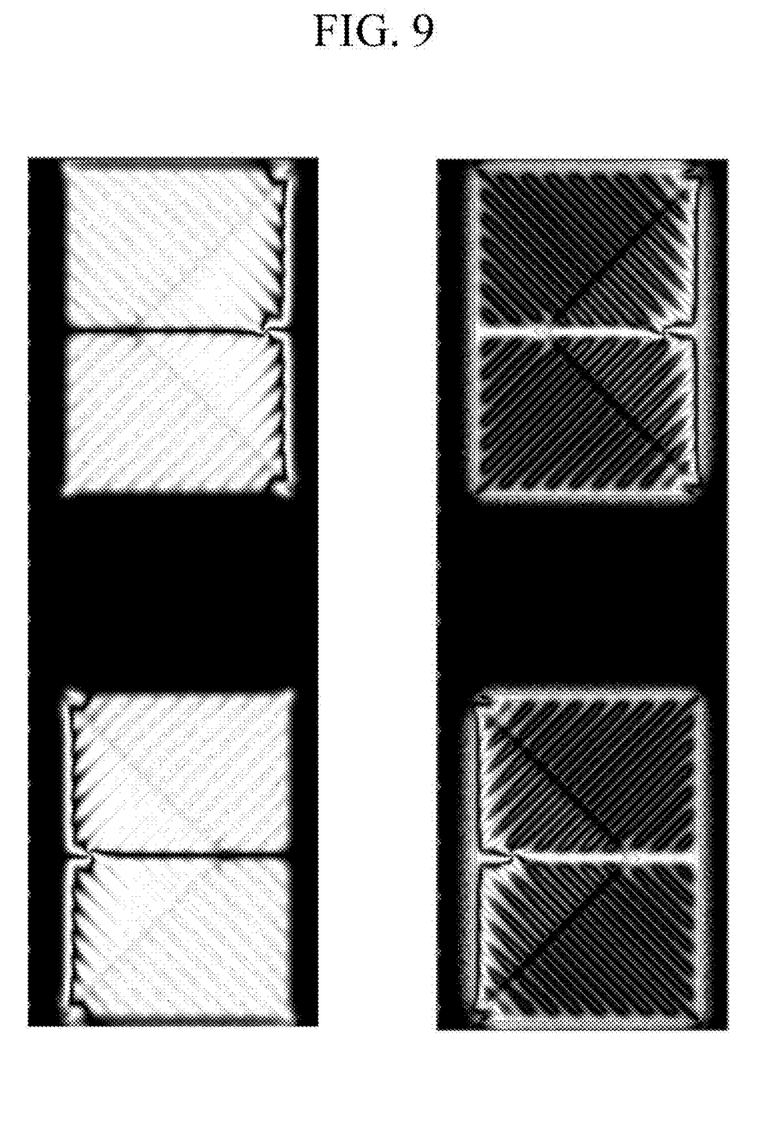
FIG. 9 is an image of a display device according to an exemplary embodiment.

However, in case of the display device according to an exemplary embodiment, the lengths of the minute branches are not uniform. As shown in FIG. 5A and FIG. 9, the length of the minute branch in an area that is adjacent to the vertical stem is increased, and the lengths of the minute branches are entirely different from each other. Such an increased length of the minute branch may increase a liquid crystal control force, and since the lengths of the minute branches are different from each other, a difference of liquid crystal control forces according to a location difference can be compensated, and accordingly, the liquid crystal molecules can be uniformly aligned.

In addition, in case of the display device of FIG. 7, only the first subpixel electrode or only the second subpixel electrode exists in one region (A or B), and minute branches in each region extend in four direction. Thus, a boundary where alignment of the liquid crystal molecules is changed exists three times.

However, in the display device in accordance with an exemplary embodiment, e.g., as shown in FIG. 5A, the first subpixel electrode and the second subpixel electrode both exist in one region, and the minute branches are extended in two directions. Thus, a boundary where an alignment of the liquid crystal molecules is changed exists only once, and generation of a texture can be prevented in the boundary.

FIG. 9 is an image of the display device according to the exemplary embodiment. Referring to FIG. 9, it can be observed that no texture is generated in a boundary of the pixel electrode in the display device according to the exemplary embodiment.

Thus, when the liquid crystal display according to the present exemplary embodiment is implemented as a curved display, generation of a texture can be prevented, and liquid crystal molecules are tilted with different angles in one pixel area so that side visibility can be improved.

Figure 10:
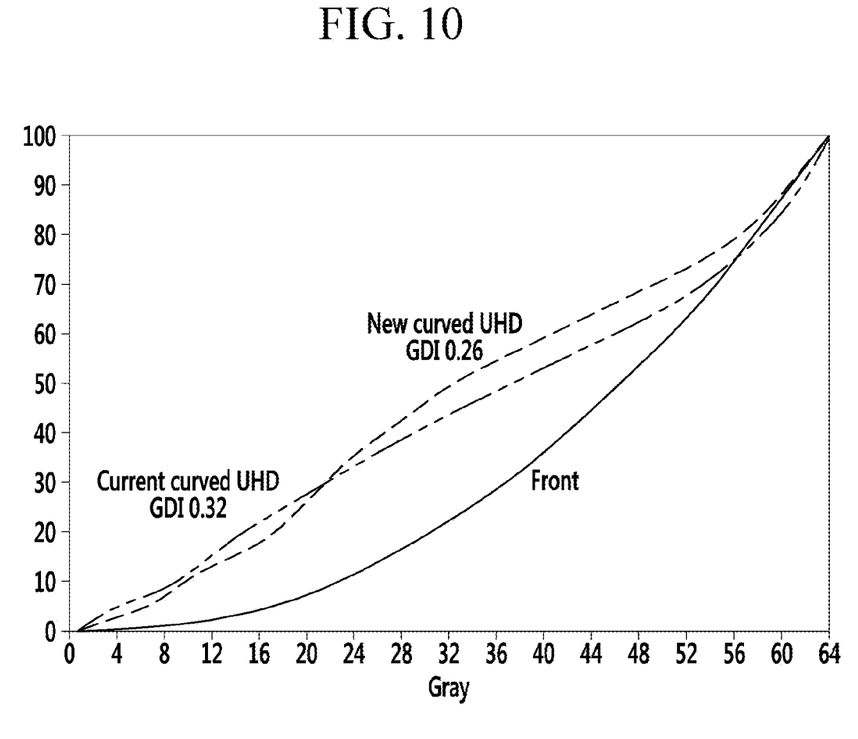
FIG. 10 shows a visibility simulation result of the display device according to the exemplary embodiment and the display device according to the comparative example.

FIG. 10 shows the display device according to the exemplary embodiment and a visibility simulation result according to a comparative example. Referring to FIG. 10, it can be observed that a display device (the display device of FIG. 7) according to the comparative example has a GDI index of 0.32, but the display device according to the exemplary embodiment has a GDI index of 0.26. That is, visibility is improved by 0.06.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

DESCRIPTION OF SYMBOLS

GL, 121: gate line RL, 131: divided reference voltage line
DL, 171: data line Clca, Clcb: liquid crystal capacitor
Qa, Qb, Qc: switching element (thin film transistor)
110, 210: substrate 124*a*, 124*b*, 124*c*: gate electrode
140: gate insulating layer 154*a*, 154*b*, 154*c*: semiconductor
163*a*, 165*a*, 163*b*, 165*b*, 163*c*, 165*c*: ohmic contact
173*a*, 173*b*, 173*c*: source electrode 175*a*, 175*b*, 175*c*: drain electrode
180*p*, 180*q*: passivation layer 191*a*, 191*b*: subpixel electrode
220: light blocking member 230: color filter

What is claimed is:

1. A liquid crystal display comprising:
    a first substrate;
    a gate line disposed on the first substrate;
    an insulating layer disposed on the gate line; and
    a first subpixel electrode and a second subpixel electrode including a plurality of pixel branch electrodes,
    wherein the first subpixel electrode and the second subpixel electrode respectively comprise a first region and a second region,
    the first region and the second region of the first subpixel electrode have a polygonal shape where two sides meet in a diagonal line, and one of sides of the polygon, excluding the diagonal line, is perpendicular to the gate line,
    the first region and the second region of the second subpixel electrode have grooves disposed at one of sides thereof corresponding to the shape of the first subpixel electrode,
    the first region and the second region of the first subpixel electrode are connected with each other, and
    the first region and the second region of the second subpixel electrode are connected with each other,
    wherein the first region and the second region of the first subpixel electrode are disposed in the shape of a triangle, and the first region and the second region of the second subpixel electrode are disposed in the shape of a quadrangle having a triangular-shaped groove disposed in one side thereof corresponding to the first subpixel electrode.

2. The liquid crystal display of claim 1, wherein the first subpixel electrode comprises a vertical stem that is perpendicular to the gate line, a horizontal stem connected with the vertical stem and perpendicular to the vertical stem, and a plurality of minute branches extended in lateral diagonal directions from the horizontal stem.

3. The liquid crystal display of claim 2, wherein the length of the minute branches is the longest in a portion close to the vertical stem and is gradually decreased away from the vertical stem.

4. A liquid crystal display comprising:
a first substrate;
a gate line disposed on the first substrate;
an insulating layer disposed on the gate line; and
a first subpixel electrode and a second subpixel electrode including a plurality of pixel branch electrodes,
wherein the first subpixel electrode and the second subpixel electrode respectively comprise a first region and a second region,
the first region and the second region of the first subpixel electrode have a polygonal shape where two sides meet in a diagonal line, and one of sides of the polygon, excluding the diagonal line, is perpendicular to the gate line,
the first region and the second region of the second subpixel electrode have grooves disposed at one of sides thereof corresponding to the shape of the first subpixel electrode,
the first region and the second region of the first subpixel electrode are connected with each other, and
the first region and the second region of the second subpixel electrode are connected with each other, wherein the first subpixel electrode comprises a vertical stem that is perpendicular to the gate line, a horizontal stem connected with the vertical stem and perpendicular to the vertical stem, and a plurality of minute branches extended in lateral diagonal directions from the horizontal stem, wherein the vertical stem of the first region of the first subpixel electrode and the vertical stem of the second region of the first subpixel electrode are located at opposite sides.

5. The liquid crystal display of claim 3, wherein the vertical stem of the first region of the first subpixel electrode and the vertical stem of the second region of the first subpixel electrode are located at the same side.

6. A liquid crystal display comprising:
a first substrate;
a gate line disposed on the first substrate;
an insulating layer disposed on the gate line; and
a first subpixel electrode and a second subpixel electrode including a plurality of pixel branch electrodes,
wherein the first subpixel electrode and the second subpixel electrode respectively comprise a first region and a second region,
the first region and the second region of the first subpixel electrode have a polygonal shape where two sides meet in a diagonal line, and one of sides of the polygon, excluding the diagonal line, is perpendicular to the gate line,
the first region and the second region of the second subpixel electrode have grooves disposed at one of sides thereof corresponding to the shape of the first subpixel electrode,
the first region and the second region of the first subpixel electrode are connected with each other, and
the first region and the second region of the second subpixel electrode are connected with each other, wherein an extended portion of the first region of the first subpixel electrode crossing the first region of the second subpixel electrode is disposed in the first region of the first subpixel electrode, and the extended portion is connected with the second region of the first subpixel electrode.

7. The liquid crystal display of claim 6, comprising:
a first drain electrode and a second drain electrode disposed on the insulating layer; and
a passivation layer disposed on the first drain electrode and the second drain electrode,
wherein a first contact hole extending to the first drain electrode and a second contact hole extending to the second drain electrode are disposed in the passivation layer, and
the extended portion connecting the first region of the first subpixel electrode and the second region of the first subpixel electrode contacts the first drain electrode through the first contact hole.

8. A liquid crystal display comprising:
a first substrate;
a gate line disposed on the first substrate;
an insulating layer disposed on the gate line; and
a first subpixel electrode and a second subpixel electrode including a plurality of pixel branch electrodes,
wherein the first subpixel electrode and the second subpixel electrode respectively comprise a first region and a second region,
the first region and the second region of the first subpixel electrode have a polygonal shape where two sides meet in a diagonal line, and one of sides of the polygon, excluding the diagonal line, is perpendicular to the gate line,
the first region and the second region of the second subpixel electrode have grooves disposed at one of sides thereof corresponding to the shape of the first subpixel electrode,
the first region and the second region of the first subpixel electrode are connected with each other, and
the first region and the second region of the second subpixel electrode are connected with each other, wherein the second subpixel electrode comprises a vertical stem perpendicular to the gate line, a plurality of horizontal stems connected to the vertical stem and perpendicular to the vertical stem, and a plurality of minute branches extended in lateral diagonal directions from the horizontal stems.

9. The liquid crystal display of claim 8, wherein the plurality of horizontal stems are respectively located in upper, middle, and lower portions of each region of the first region and the second region of the second subpixel electrode, and
the horizontal stems in the upper and lower portions are longer than the horizontal stems in the middle portion.

10. The liquid crystal display of claim 9, wherein, in the first region or the second region of the second subpixel electrode, the horizontal stem in the middle portion is removed.

11. The liquid crystal display of claim 10, wherein the vertical stem in the first region of the second subpixel electrode and the vertical stem in the second region of the second subpixel electrode are located at opposite sides.

12. The liquid crystal display of claim 10, wherein the vertical stem of the first region of the second subpixel electrode and the vertical stem of the second region of the second subpixel electrode are located at the same side.

13. The liquid crystal display of claim 1, wherein the first region of the second subpixel electrode and the second region of the second subpixel electrode are connected through an extended line of the second subpixel electrode, and the extended line of the second subpixel electrode extends to the outside of the first subpixel electrode or extends while crossing an area where the gate line is disposed.

14. The liquid crystal display of claim 1, comprising:
a first drain electrode and a second drain electrode disposed on the insulating layer; and
a passivation layer disposed on the first drain electrode and the second drain electrode,
wherein a first contact hole extending to the first drain electrode and a second contact hole extending to the second drain electrode are disposed in the passivation layer, and
an extended line connecting the first region of the second subpixel electrode and the second region of the second subpixel electrode contacts the second drain electrode through the second contact hole.

15. The liquid crystal display of claim 1, comprising:
a second substrate corresponding to the first substrate;
a common electrode disposed on the second substrate; and
a liquid crystal layer provided between the first substrate and the second substrate,
wherein a voltage configured to be applied to the first subpixel electrode and a voltage configured to be applied to the second subpixel electrode are different from each other.

16. The liquid crystal display of claim 1, wherein alignment layers are provided on the first subpixel electrode and the second subpixel electrode,
each alignment layer has a pretilt of a predetermined angle, and
a pretilt angle formed in an alignment layer on the first subpixel electrode is greater than a pretilt angle formed in an alignment layer on the second subpixel electrode.

17. The liquid crystal display of claim 1, wherein the first subpixel electrode and the second subpixel electrode do not overlap each other.

18. The liquid crystal display of claim 1, wherein the liquid crystal display is a curved display.

19. The liquid crystal display of claim 1, wherein the first region is provided above the gate line and the second region is provided below the gate line.

* * * * *